United States Patent [19]

Moore

[11] 4,393,645

[45] Jul. 19, 1983

[54] REAR BAGGER ATTACHMENT FOR LAWN MOWER

[75] Inventor: James W. Moore, Beaver Dam, Wis.

[73] Assignee: Deere & Company, Moline, Ill.

[21] Appl. No.: 294,261

[22] Filed: Aug. 19, 1981

[51] Int. Cl.³ .......................................... A01D 35/22
[52] U.S. Cl. ...................................... 56/202; 56/16.6
[58] Field of Search ....................... 56/202, 203, 16.6; 220/306

[56] References Cited

U.S. PATENT DOCUMENTS

| | | | |
|---|---|---|---|
| 178,622 | 6/1876 | Ford | 220/306 |
| 3,716,977 | 2/1973 | Jackson | 56/202 |
| 3,934,392 | 1/1976 | Moery | 56/202 |
| 3,958,401 | 5/1976 | Carpenter | 56/202 |
| 3,974,631 | 8/1976 | Rhodes | 56/202 |
| 4,047,368 | 9/1977 | Peterson | 56/202 |
| 4,054,023 | 10/1977 | Carpenter | 56/202 |
| 4,095,398 | 6/1978 | Aumann et al. | 56/202 |
| 4,106,272 | 8/1978 | Peterson et al. | 56/202 |
| 4,156,337 | 5/1979 | Knudson | 56/202 |
| 4,168,600 | 9/1979 | Klug | 56/202 |

OTHER PUBLICATIONS

Literature "John Deere Lawn Tractors and Riding Mowers", A-59-80-10.

*Primary Examiner*—Gene Mancene
*Assistant Examiner*—John Weiss

[57] ABSTRACT

A bagger attachment for a tractor has a bag frame that includes a pair of upright brackets fixed to the rear end of the tractor which support, for vertical sliding action, a pair of plates fixed to respective bag rims. There is provided, on the lawn mower, an upwardly and rearwardly projecting grass duct that has its upper discharge end positioned over the bag rims and which directs the grass clippings in a transverse direction. Flexible bags are provided on each of the rims and depend therefrom. A bagger lid receives the discharge end of the tube. The lid is mounted on an axis that is substantially perpendicular to the portion of the duct that extends through the opening in the lid so that as the lid is raised, the duct will slide through the opening. For discharging the bag, the rim may be raised to cause the horizontal plates to slide free of the vertical brackets. The lid has, at its lower edge, a rib that snaps under the respective rims and tends to rigidify the bag assembly, as well as to hold down the lid. The rib may be used to retain plastic liners that have their upper ends draped over the rims.

13 Claims, 6 Drawing Figures

REAR BAGGER ATTACHMENT FOR LAWN MOWER

BACKGROUND OF THE INVENTION

A common type of lawn mower for a small lawn and garden tractor includes a mower deck mounted in underslung relation to the tractor. A discharge duct extends from one side of the mower upwardly and rearwardly to a bagger assembly mounted on the rear end of the tractor. The bagger assembly has conventionally included a basic bag or can sub-frame fixed to a rear portion of the tractor to support either a detachable fabric bag or a pair of plastic cans. The bag or cans may be dismounted from the tractor for purposes of discharging grass from them. The duct, in many instances, that carries the grass from the mower to the bagging assembly, enters the bagging assembly through an inlet at the upper outer end of a basket lid. The upper end of the duct is shaped to direct the grass across the upper portion of the bag or cans and to fill, in the instance where cans are used, the cans in the order in which they are spaced from the outlet, i.e., the can furthest from the discharge outlet of the duct is filled first, followed by the can closer to the outlet. Since some of the tractors require a rear fueling tank with a rear fuel inlet, the cans or bag must be removed for purposes of filling the tank. This requires that the lid be raised and the cans or bag removed.

One of the problems that has existed is the problem of raising the lid so as to be sufficiently out of the way of the fuel inlet. Also, in the past, the duct leading into the lid was required to be sufficiently flexible itself or be so flexibly mounted that it would not interfere with the raising or lowering of the lid. Further, since the lawn and garden tractors are relatively small, there is a seat positioned directly and closely adjacent the forward side of the lid which limits the amount the lid can be raised.

Conventional type rear bagger assemblies, in some instances, use solid plastic bags or containers that receive the grass, while others provide for a fabric-type bag that extends completely across the full extent of the bagging assembly. In the latter instance, it may be desirable to provide plastic liners that can be easily removed from the fabric bag. In either case, whether the bags are solid plastic or fabric with plastic liners, there must be provided an outlet for the air that moves through the duct and into the bagging attachment. Often, this outlet is a grilled-type outlet which often becomes clogged.

SUMMARY OF THE PRESENT INVENTION

With the above in mind, the bagger assembly, which forms the subject matter of the present invention, incorporates the use of two fabric bags that depend from and are supported on a pair of rectangular-shaped horizontal rims disposed in side-by-side relation at the rear end of the tractor. The rims are provided with forwardly projecting plate members with transverse slots therein that fit over a respective pair of upright metal straps so that the bags cannot rock or rotate or move laterally about the vertical axis of the straps. The horizontal plates contact stops on the straps at a level that the bags are beneath the discharge end of the duct that rises from the lower deck. The lid for the bagger assembly is composed of a one-piece, solid plastic crown that has an inlet for the discharge portion of the duct. The discharge portion of the duct at the lid is inclined rearwardly and inwardly and has its transversely facing discharge outlet positioned well over the bag on the duct side of the tractor. The lid is supported on a pivot whose axis is substantially perpendicular to the inclination of the rear portion of the duct so that as the lid is raised, the duct will slide through the opening in the lid with little or no interference. The lid is further characterized by the end thereof that receives the duct projecting transversely outwardly from the respectively outermost bag at that end. This extension serves as an air discharge for the bag assembly.

The fabric bags may be lined with removable plastic liners that overhang the respective rim of the bags. The plastic lid has, on its lower lip, a rib that snaps under the respective rims and should a liner be inserted into the bag, it will tend to hold that liner in proper position in the fabric bag.

DESCRIPTION OF THE PREFERRED EMBODIMENT

Figure 1:
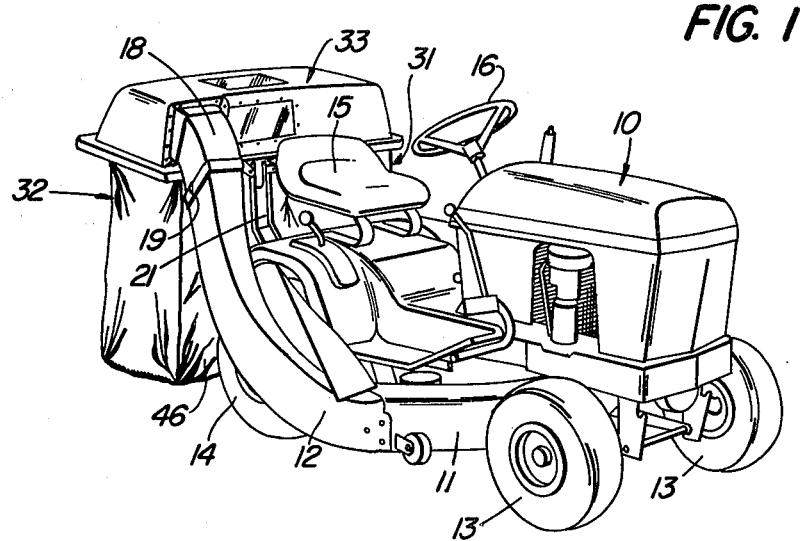
FIG. 1 is a front and right side perspective view of a tractor and a tractor-mounted lawn mower utilizing the bagging assembly of the present invention.

Referring now to FIG. 1, a tractor 10, of the lawn and garden variety, has mounted on its underside a mower deck 11 having a side discharge that feeds cut hay into an upwardly and rearwardly extending curved duct 12. The tractor 10 has front steerable wheels 13 and rear traction wheels 14. An operator's station, indicated by a seat 15 and steering wheel 16, is provided on the tractor 10. The tractor 10 also has a rear fuel tank with a rearwardly positioned fuel inlet 17.

The duct 12 extends upwardly and rearwardly outboard of the right rear traction wheel 14. The portion of the duct 12 rearwardly of the rear traction wheel 14 curves inwardly and is connected to a rear duct portion 18 that, while curved, generally is inclined inwardly with respect to the fore-and-aft center line of the tractor. The rear portion 18 of the duct 12 is pivotally mounted to the portion by transverse horizontal plates, such as is shown at 19. Thus, the upper portion 18 may be freely movable or adjustable vertically.

Bolted to the rear lower portion of the tractor frame and just inwardly of the right rear wheel 14 is a U-shaped mounting stirrup 20 that receives the lower end of a rearwardly and upwardly inclined bagger frame member or bracket 21. The bracket 21 has forwardly extending vertical flanges, such as are shown at 22, on opposite sides thereof. A slot 23 is cut in the uppermost end thereof and centrally between the flanges 22. The lower end of the arm 21 and particularly the flanges 22 are cut at an angle and bear against a vertical plate 24 of the tractor frame. A pin 25 extends through the flange 22 and opposite vertical walls of the stirrup 20 and retains the frame member 21 in a fixed position with respect to the stirrup. The entire bagging assembly is supported on the frame member 21 and therefore, the entire bag assembly, as well as the frame 21, may be removed from the tractor merely by withdrawing the pin 25.

Figure 2:
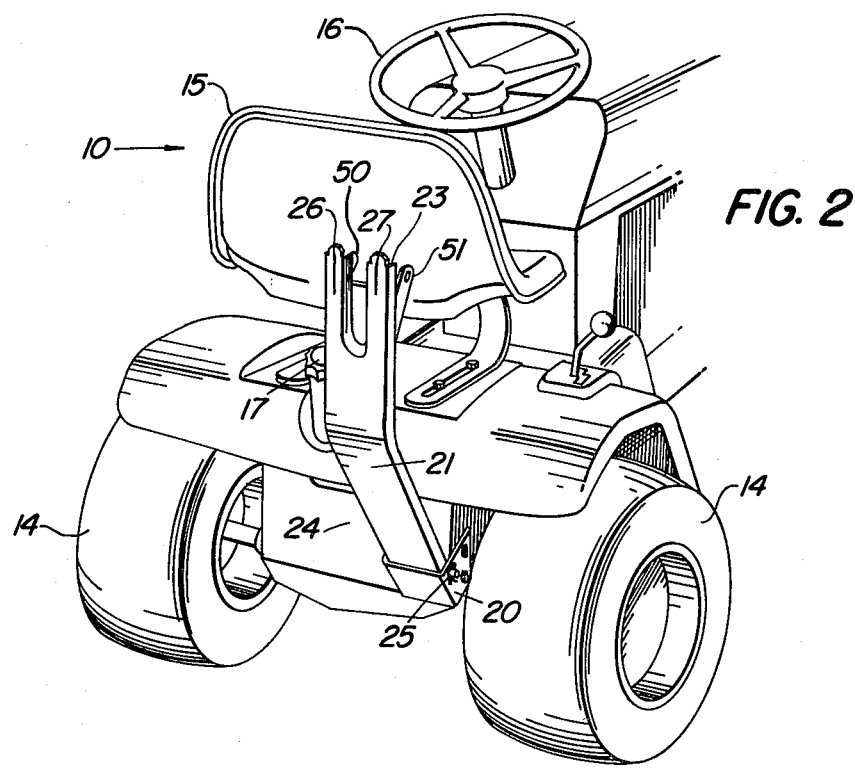
FIG. 2 is a rear perspective view of the tractor showing the mounting frame for the bagging assembly, but with the bags removed therefrom.

The slot 23 divides the frame member 21 into two distinct vertical leg or bracket members 26, 27. The slot 23 has, at its edges, a forwardly extending flange 28. The uppermost ends of the flanges 22 and 28 are removed to provide transverse tips or straps 29, 30 that have their uppermost convergent edges. It should be noted, from viewing FIGS. 2 and 5, that the fuel inlet or cap 17 is centrally located and the frame member 21 and its supporting saddle 20 are offset to the right of the cap 17.

Figure 3:
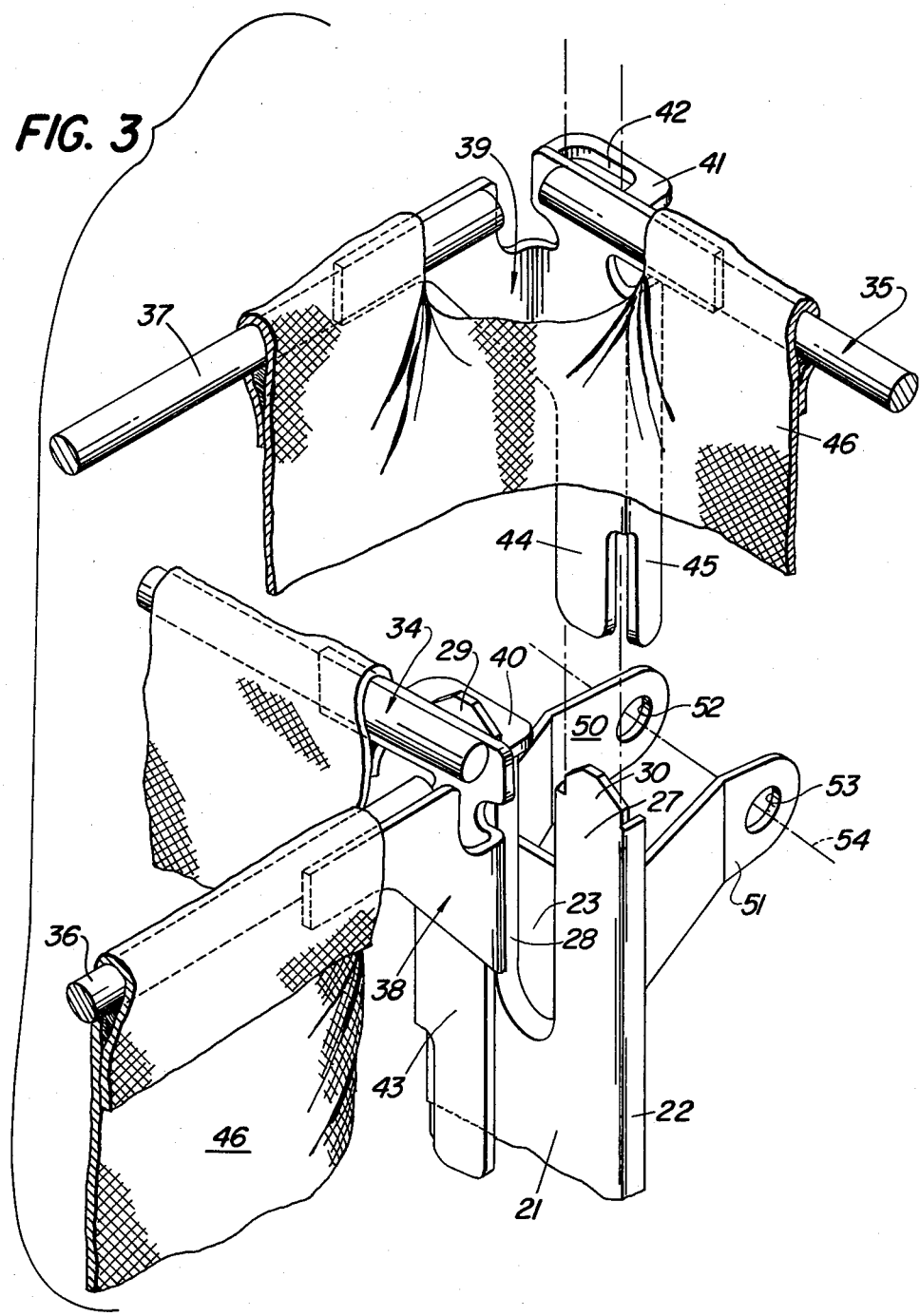
FIG. 3 is an enlarged perspective and partially exploded view showing the upper end of the bagger frame and portions of the bag devices that are mounted on the frame.

Carried on the frame 21 are a pair of bag structures, indicated by the reference numerals 31, 32, and a plastic top, indicated in its entirety by the reference numeral 33. Each of the bag structures 31, 32 are composed of round metal rods formed into square or rectangular-shaped rims 34, 35 and having adjacent sides 36, 37 that are parallel and closely adjacent one another. The rods 34, 35 are single pieces with opposite ends thereof being at the corners adjacent the supporting frame member 21. Referring now specifically to FIG. 3, corner brackets 38, 39 are utilized to connect the respective free ends of the rods 34, 35. The corner brackets 38, 39 each have horizontal metal plate portions positioned alongside the respective ends of their respective rods 34, 35 with the respective leg portions being welded to the end portions of the respective rod. Integral with the leg portions are horizontal flanges 40, 41 that project forwardly substantially at the level of the rods 34, 36. The flanges 40, 41 have notches, one of which is shown at 42 in the flange 41, that receive the tips 29, 30 of the respective vertical leg members 26, 27. The notches are of substantially the same size as the outer dimensions of the tips 29, 30 and will slide downwardly on the tips 29, 30 until they contact the uppermost end of the flanges 22, 28. The ends of the flanges 22, 28 therefore serve as stops for limiting the downward movement of the respective flanges 40, 41 and, of course, the total bag structures 31, 32. The corner brackets 38, 39 are also provided with integral vertical flanges 43, 44 that bear against the front surface of the frame member 21. Each of the vertical flanges 43, 44 has, in turn, vertical fore-and-aft extending flange portions, one of which is shown at 45, that bear against the respective side flanges 22 of the vertical frame member 21. As can best be viewed in FIG. 3, to remove the entire left bag structure 31, it is merely necessary to raise the flange 40 clear of the tip 29. The shape of the notches 42 and the flanges 43–45 prevent or limit transverse and fore-and-aft rocking of the respective bag structures. The bag structures 31, 32 are provided with fabric bags 46 that may be sewed on the respective rims 34, 35 or secured thereon by suitable snaps, not shown, that are conventional on such bags. Thus, the corner brackets 38, 39 support their respective rims 34, 35 and the respective bag 46 in cantilever fashion from the corners of the rims and on the frame 21.

Figure 4:
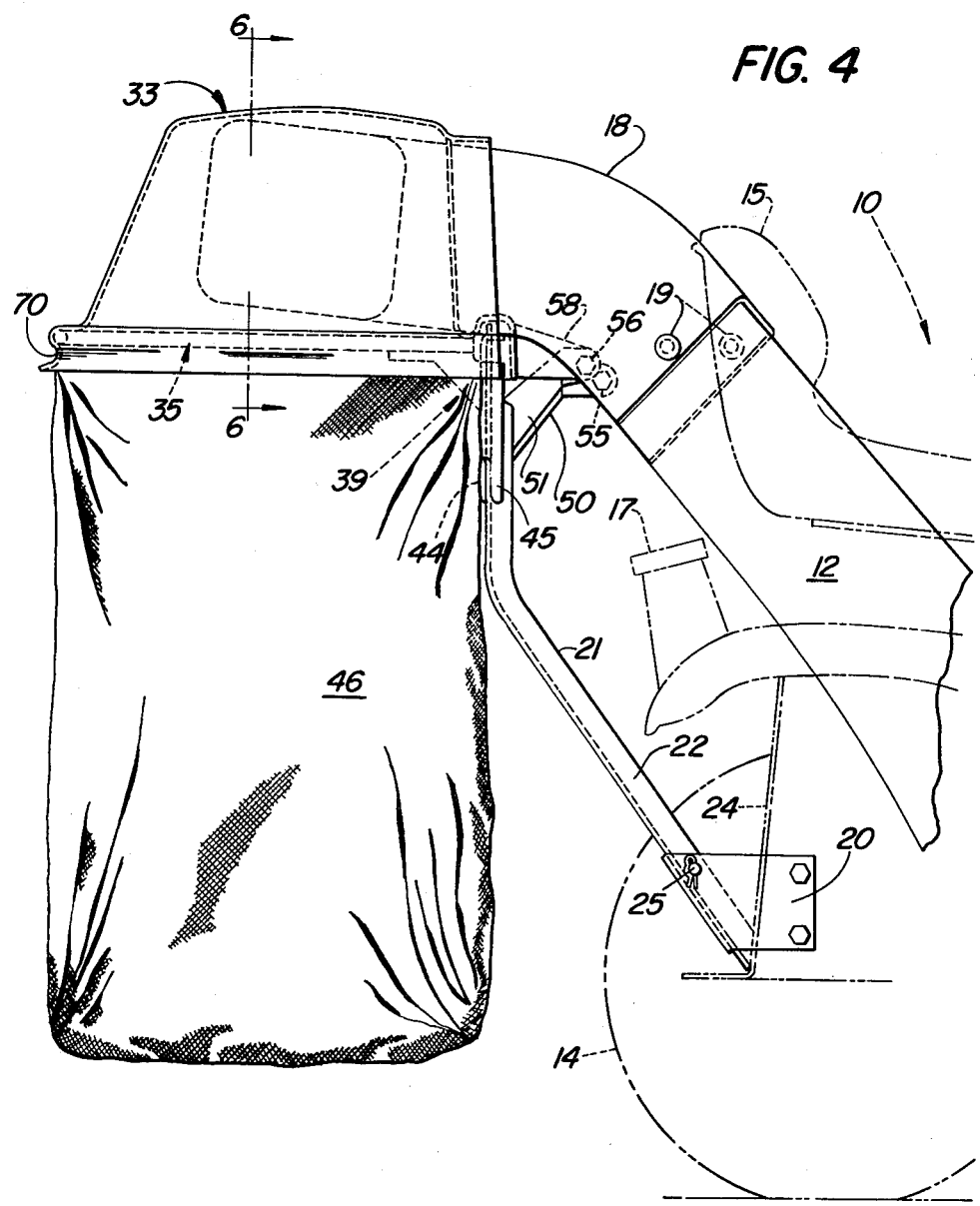
FIG. 4 is a side elevation of the bag assembly with the rear portion of the tractor shown in phantom.
Figure 5:
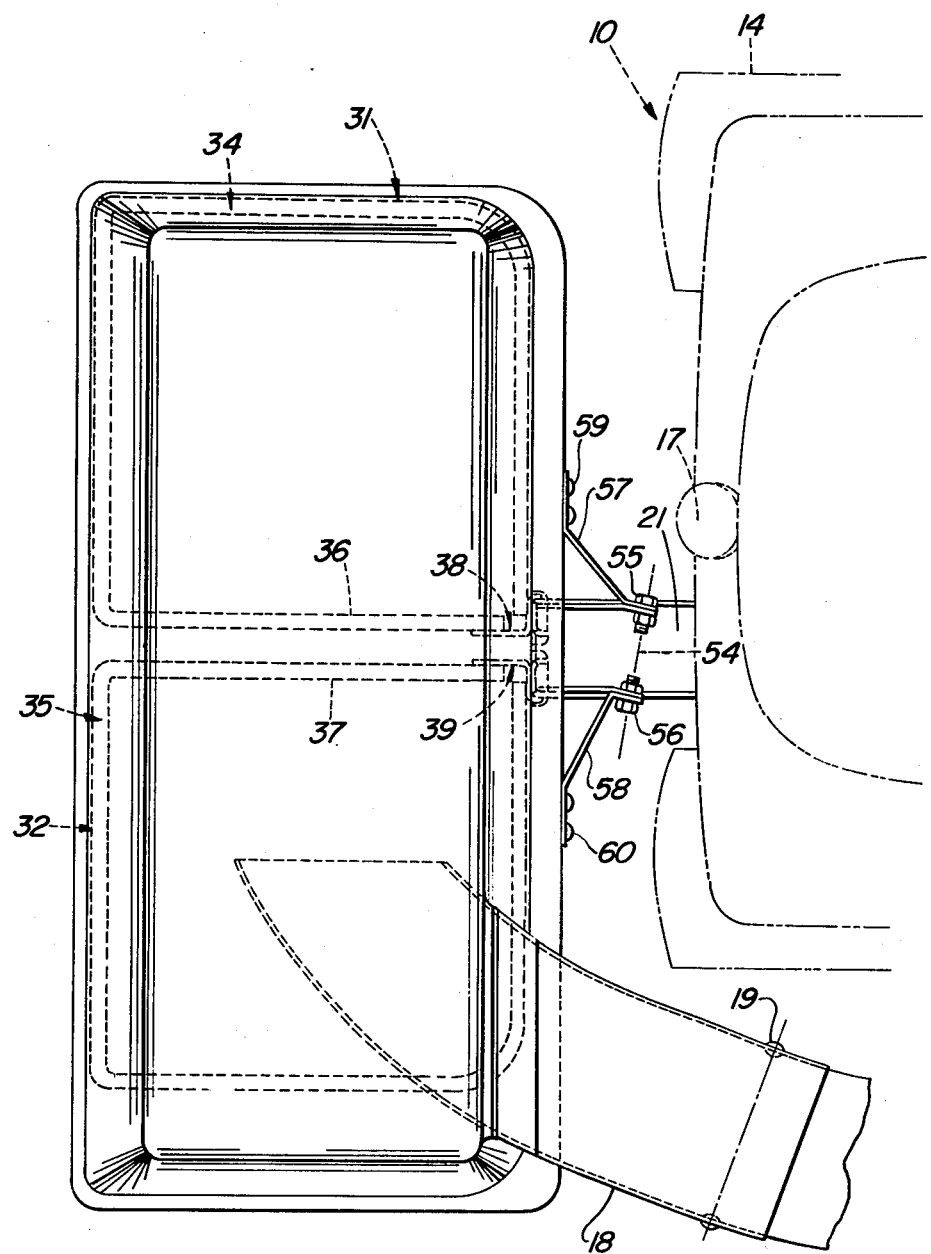
FIG. 5 is a planned view of the bag assembly with the rear portion of the tractor shown in phantom.

A U-shaped bracket is welded to the upper portion of the frame member 21 and has opposite leg portions 50, 51 projecting forwardly. At the forward ends of the leg portions 50, 51 there are provided pin openings 52, 53, respectively, that are aligned with one another on an axis 54. The axis 54, as can best be seen from viewing FIGS. 4 and 5, is inclined rearwardly from left to right and also inclined upwardly from left to right, each inclination being about 10 degrees with respect to its major axes. A pair of pins 55, 56 pivotally mount a pair of brackets 57, 58 on the respective arms 50, 51. The rear ends of the brackets 57, 58 are bent in a transverse direction and are riveted at 59, 60 to the front, central portion of the lid or top 33. Therefore, the entire lid 33 may swing about the axis 54. The top 33 has a rectangular-shaped opening 65 through which the upper duct portion 18 passes into the interior of the bag assembly. Riveted at 66 to the lid adjacent the opening 65 is a rubber rectangular collar 67 that extends from the edges of the opening 65 inwardly to engage the outer surface of the duct portion 18. The seal 67 serves to seal the top around the duct portion 18 and prevent grass, other foreign materials, and air from being blown out of the bag assembly while, at the same time, permitting a degree of relative movement between the duct portion 18 and the bag top 33. It should here be noted, referring to FIG. 5, that a continuation of the axis 54 is on a line substantially perpendicular to the axis of the duct portion 18. Thus, as the top 33 is raised and lowered, the rubber seal or mat 67 may easily slide on the duct portion 18.

The top 33 is in cross-section crown-shape, leaving sufficient passageway for the grass being blown through the discharge outlet of the duct portion 18 to move transversely over both bags 31, 32. The duct portion 18 has, at its uppermost end, a curved section that places the discharge outlet substantially parallel to the direction of travel and so that the grass clippings will move in the transverse direction. As shown in FIG. 5, the discharge outlet is located transversely substantially on but slightly inwardly of the fore-and-aft centerline of the right-hand bag structure 32 thereby assuring that grass clippings being blown through the outlet will fill the left-hand bag structure 31 prior to filling the right-hand bag structure 32. The top 33 has a ribbed lower lip, such being shown at 70, that extends around the ends and the back side of the top. The purpose of the rib 70 is two-fold. First, it tends to rigidify the bag structures 31, 32 with the top 33 when the top is in its down and latched position, such occurring when the rib is snapped under the rims 34, 35. Since the top 33 is made of a solid plastic material, the ribs 70 can be distorted for latching the top to the rims and also further distorted for purposes of permitting raising of the top 33. Thus, it serves as a detent for retaining lid 33 in its down position. Also, it is desirable, in many instances, to provide fabric bags 46 with plastic liners. When such occurs, the upper ends of the liners will extend or drape over the rims 34, 35. When the top is lowered into its latched position, the top and rib 70 will hold the plastic liners in their correct positions. Plastic liners so mounted will also have portions thereof draped over the corner brackets 40, 41 into the slot 23 and forward of the vertical brackets 26, 27 respectively. Providing the slot 23 to receive the draped portions of the plastic liners prevents bunching of the liners at the respective forward inner corners of the bag structures 34, 35.

Figure 6:
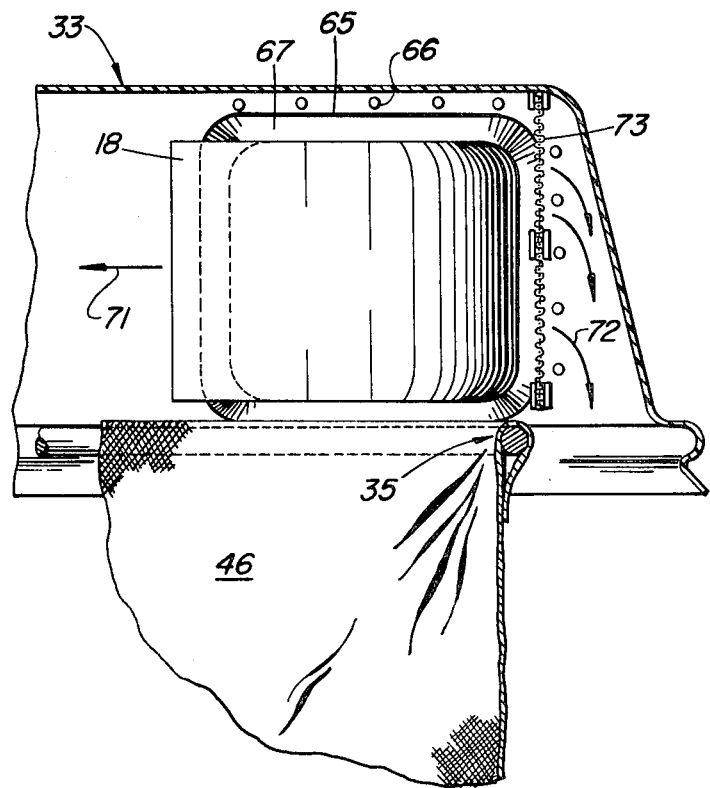
FIG. 6 is a sectional view taken substantially along the 6—6 of FIG. 4.

Referring now specifically to FIGS. 5 and 6, the right end of the top 33 projects considerably outward of the outermost side of the rim 35. When plastic liners are used in the fabric bags 46, they become fairly leak-proof. In order to permit proper filling of the bags from the discharge duct portion 18, there must be provided means for discharging the air. Grass and air being moved through the discharge end of the duct portion 18 are directed to the left-hand end of the bag assembly. As the grass falls into the left-hand bag 31, the air moving with the grass will be returned past the duct and be discharged at the overhanging or right-hand end of the lid 33. The direction of air flow is indicated at 72, as it leaves the bag assembly. As the left-hand bag becomes full, the grass clippings will then fill the right-hand bag and the air will continue to move out, as indicated at 72. A grille 73 is placed and supported in the lid 33 for purposes of preventing grass clippings, leaves, and such from falling over the rim 35 at the air discharge opening.

If plastic liners are not used, the bag structures 31, 32 may be emptied by raising the respective rims 31, 32 and its bag 46 from the respective tips 29, 30 and emptying the respective bag in any desired location. The respective bag structures 31, 32 may be replaced by manually moving the slots 42 in the flanges 40, 41 to a position for receiving the respective tips 39, 30. It should also be understood that one of the advantages of having such a bag assembly is that the left-hand bag structure 31 may be easily removed when it is desired to refuel the tractor's gas tank. Also, by having the top 33 positioned to move about the inclined axis 54, the top may be raised so that the left-hand end thereof is not in the vicinity of the fuel inlet. Also, by having the axis 54 considerably forwardly of the top body 33, there will be substantial vertical movement of the top 33 as it is folded forwardly and upwardly, thereby further moving the top from the vicinity of the gas cap 17.

Should it be desired to remove the entire mowing device from the mower, the entire bagging assembly may be removed merely by removing the single pin 25 and raising the frame member 21 out of the stirrups or saddle 20.

I claim:

1. A bag assembly for a lawn mower carried in underslung relation on a vehicle having rear wheels supporting the vehicle frame and a fuel tank with a rear fuel inlet, and in which the mower has a duct extending upwardly and rearwardly to a rear inwardly directed discharge portion terminating at a discharge opening rearward of the fuel inlet and for directing grass clippings transverse of the vehicle, said bag assembly comprising: a bagger frame mounted on the vehicle frame and having a pair of spaced upright straps having opposite edges and front and rear faces and located rearwardly of and outwardly of the fuel inlet and transversely inwardly of the discharge opening; a pair of rod-like horizontally disposed rectangular-shaped bag supporting rims with adjacent fore-and-aft extending sides extending rearwardly from inner forward corners; rim supports rigid with the respective rims projecting forwardly from said corners respectively and having vertical slots therein substantially of the cross-sectional shape of said straps for vertical sliding movement to and from lowermost positions slightly lower than the discharge outlet and for supporting said rims in cantilever fashion from said corners; a pair of bags mounted on and depending from the respective rims; a crowned top extending over the respective rims and having a forward opening receiving and for passing the discharge portion of the duct into the top; hinge means mounting the top on an axis substantially perpendicular to the discharge portion of the duct whereby the lid may be swung upwardly and forwardly and outwardly while permitting the discharge portion of the duct to slide through the opening, and detent means on the lower periphery of the top engageable with the rims for retaining the top in a down position.

2. A bag assembly for a lawn mower carried in underslung relation on a vehicle having rear wheels supporting the vehicle frame, and in which the mower has a duct extending upwardly and rearwardly to a rear inwardly directed discharge portion terminating at a discharge opening rearward of the vehicle seat, said bag assembly comprising: a bagger frame mounted on the vehicle frame and having a pair of spaced upright straps having opposite edges and front and rear faces and located rearwardly of the seat; a pair of rod-like horizontally disposed rectangular-shaped bag supporting rims with adjacent fore-and-aft extending sides extending rearwardly from inner forward corners; rim supports rigid with the respective rims projecting forwardly from said corners respectively and having vertical slots therein substantially of the cross-sectional shape of said straps for vertical sliding movement to and from lowermost positions slightly lower than the discharge portion of the duct and for supporting said rims in cantilever fashion from said corners; a pair of bags suspended on and depending from the respective rims; a bagger top extending over the respective rims and having a forward opening receiving and for passing the discharge portion of the duct into the top; hinge means swingingly mounting the top to swing upwardly and forwardly, and detent means on the lower periphery of the lid engageable with the rims or retaining the lid in a down position.

3. A bag assembly for a lawn mower carried in underslung relation on a vehicle having rear wheels supporting the vehicle frame, and in which the mower has a duct extending upwardly and rearwardly to a rear discharge portion terminating rearwardly of the vehicle and for directing grass clippings transverse of the vehicle, said bag assembly comprising: a bagger frame mounted on the vehicle frame; a pair of rod-like horizontally disposed rectangular-shaped bag supporting rims with adjacent fore-and-aft extending sides extending rearwardly from inner forward corners; a pair of bags suspended on and depending from the respective rims; structures at said corners rigid with the respective rims and projecting forwardly from said corners; means mounting said structures at said corners on the bagger frame for vertical sliding movement to and from lowermost positions in which said rims are slightly lower than the discharge portion and for suspending the respective rims and bags in cantilever fashion from said corners; and a bagger top hinged at a forward edge to the bagger frame and extending over the respective rims and having an opening receiving and for passing material from the discharge portion of the duct into the top.

4. The invention defined in claim 3 in which the top has an inwardly projecting rib at its lower lip that snaps under the rims so as to latch the top in its closed position.

5. The invention defined in claim 3 in which the top is supported on the bagger frame about an axis substantially perpendicular to the duct portion adjacent the top and said portion enters the top through an opening in the forward side of the top.

6. The invention defined in claim 3 in which the top is supported on the bagger frame from its front side about an axis inclined rearwardly with respect to the fore-and-aft direction of the tractor so that as the top is raised it moves forwardly with respect to the end of the discharge portion of the duct that enters the top.

7. The invention defined in claim 3 in which the duct enters the top at one end of the top and the top fits tightly on the respective rim at the top's end opposite said one end, and at said one end overhangs the rim, and in which the grass clippings and air discharged from said discharge portion are directly transversely toward the end that fits tightly.

8. The invention defined in claim 7 further characterized by a grille extending across the top at said end that overhangs the latter end.

9. The invention defined in claim 3 in which the means mounting said structures at said corners on the bagger frame includes a pair of adjacent upright transverse straps on the frame and each of said structures has a forwardly projecting horizontal plate with an opening therein for receiving a respective strap, and each of said corner structures further includes a vertical member that engages the edge and side of the respective strap.

10. The invention defined in claim 3 in which the bagger frame is a singular upright member having its lower end received in a stirrup rigidly supported on the tractor and said member is held in said stirrup by a pin extending through the stirrup and member.

11. The invention defined in claim 3 characterized by plastic liners in said bags having upper end portions draped over the rims, and said bagger top is characterized by inwardly projecting rib means that snap under the rims so as to hold said upper portions of the liners on said rims.

12. The invention defined in claim 11 in which the bagger frame includes a pair of spaced apart vertical straps; and the means mounting the said structures at said corners are plates with openings therein that permit the respective plates to slide vertically on the strap, and the upper portions of the plastic liners are draped over the straps and pass between the respective straps.

13. The invention defined in claim 3 in which the rear discharge portion of the duct has an outlet positioned substantially above the fore-and-aft centerline of the bag rim located on the same side of the bagger top that the duct passes through said opening.

* * * * *